H. BURKE & W. A. PETERS.
KNOCKDOWN ENLARGING CAMERA.
APPLICATION FILED JUNE 12, 1911.
1,036,557.
Patented Aug. 27, 1912.
3 SHEETS—SHEET 1.
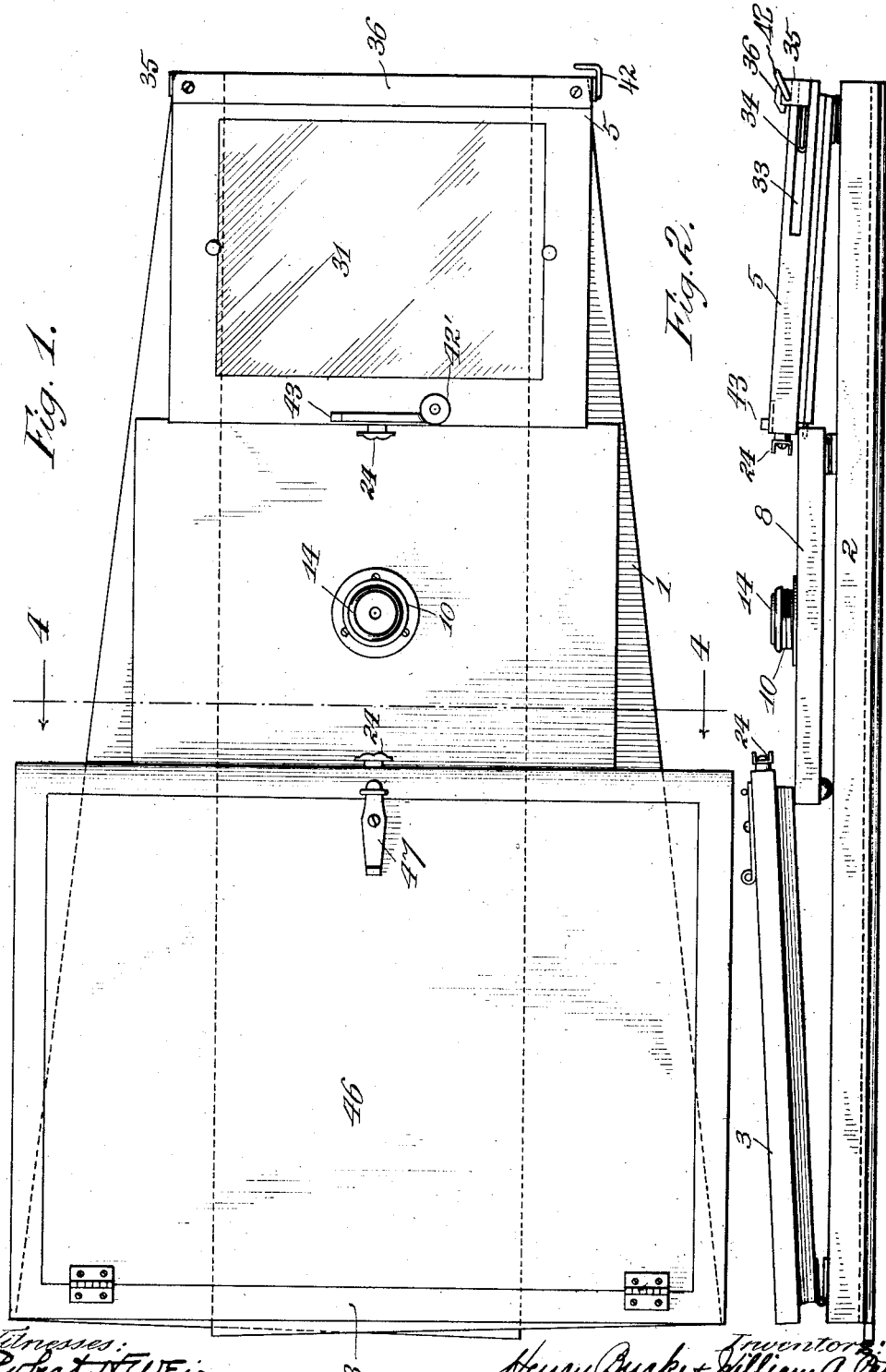

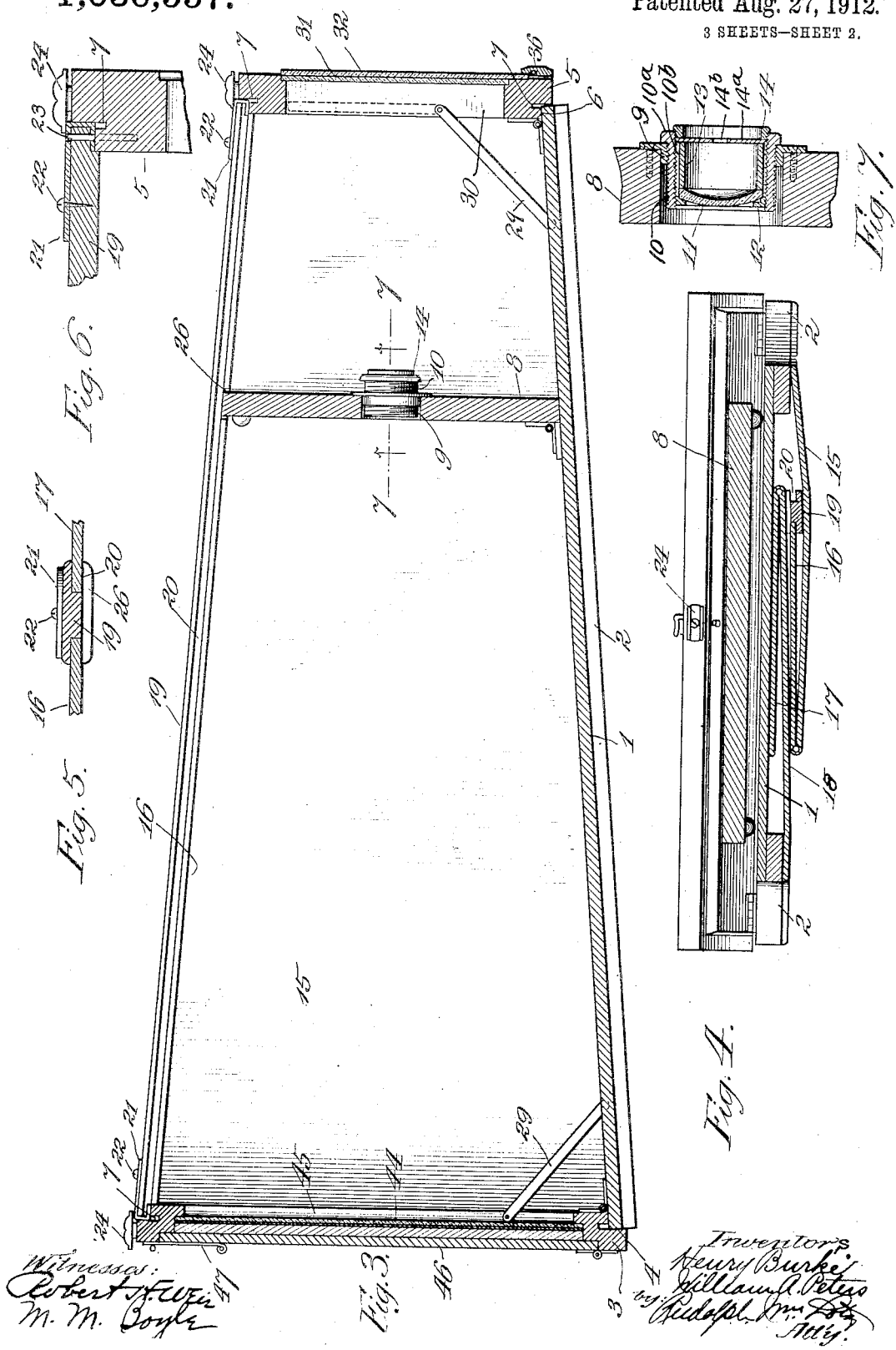

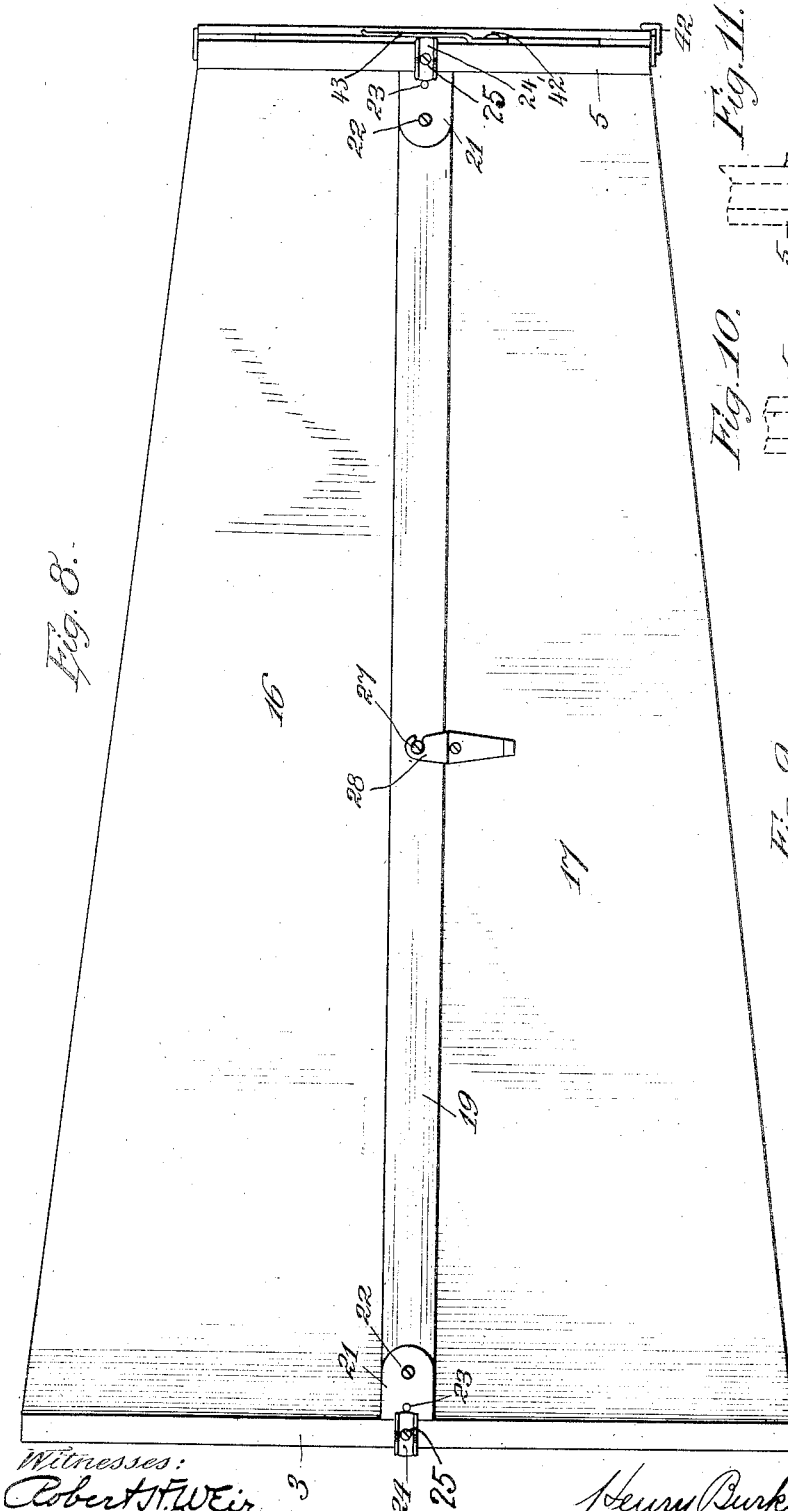

UNITED STATES PATENT OFFICE.

HENRY BURKE AND WILLIAM A. PETERS, OF CHICAGO, ILLINOIS.

KNOCKDOWN ENLARGING-CAMERA.

1,036,557. Specification of Letters Patent. Patented Aug. 27, 1912.

Application filed June 12, 1911. Serial No. 632,799.

*To all whom it may concern:*

Be it known that we, HENRY BURKE and WILLIAM A. PETERS, of Chicago, Cook county, Illinois, both citizens of the United States, have invented certain new and useful Improvements in Knockdown Enlarging-Cameras; and we do hereby declare the following to be a full, clear, and exact description of the invention, such as will enable others skilled in the art to which it appertains to make and use the same.

This invention has for its object to provide a collapsible enlarging camera, and consists in the features of construction and combinations of parts hereinafter fully described and claimed.

In the accompanying drawings illustrating the invention: Figure —1— is a top plan view of the camera in its collapsed position. Fig. —2— is a side elevation of the same. Fig. —3— is a central vertical longitudinal section of the same in its assembled position. Fig. —4— is a vertical transverse section of the same on the line 4—4 of Fig. —1—. Fig. —5— is a fragmentary detail section showing the joint between the parts of the top wall of the camera. Fig. —6— is a fragmentary detail vertical section showing the means employed for locking the parts of the top wall of the camera with the front wall thereof. Fig. —7— is a fragmentary detail horizontal section on the line 7—7 of Fig. —3—. Fig. —8— is a plan view of the camera ready for use. Fig. —9— is a detail view in elevation showing means for operating the plate-engaging device employed in one direction. Figs. —10— and —11— are detail vertical sectional views on the line 10—10 of Fig. —9— and showing the parts in respectively different positions.

Our invention has for its particular object to provide a simple and efficient enlarging camera which can be readily collapsed between the intervals of use so as to occupy very little space thus not only rendering it convenient for amateur and professional use but rendering it more convenient to pack and ship the same.

A further object of the invention is to provide simple and efficient means for engaging the plate to hold the same in position in front of the glass on the front wall of the camera.

A still further object of the invention is to provide a lens tube which is adjustably mounted in the partition wall between the front and rear walls of the camera whereby the focus can be accurately adjusted so as to produce accurate results.

Other objects of the invention will appear from the following description.

The camera comprises a bottom wall 1 of wood or other suitable material, the latter being provided along its side edges with reinforcing ribs 2. Hinged to the rear edge of said bottom 1 is the rectangular rear wall 3 of the camera, the latter being rabbeted peripherally to provide a groove 4 whereby a light-proof joint is formed between the same and the bottom and the several other walls of the camera. The front wall 5 is similarly hinged to said bottom wall at the other end thereof, and said front wall is similarly peripherally rabbeted to provide a groove 6 by means of which light-proof joints are formed between said front wall and the other walls of the camera. In rabbeting said front and rear walls, as described, the groove cut by the saw in the peripheral edge of the wall is rendered deeper than necessary so as to provide a peripheral groove 7 in the bottom of each of said rabbets into which rays of light pass through the joint between the ends of the bottom, top and side walls of the camera and the opposing walls of the rabbets 4 and 6 are projected, thus preventing reflection of any of said rays into the camera in an obvious manner. Hinged to said bottom wall 1 between the ends thereof is a partition wall 8 in the center of which there is mounted an internally threaded sleeve 9 in which the tube 10 is mounted, the latter being provided with a flange $10^a$ at one end which bears upon the annular flange of the sleeve 9 to limit the movement of the tube 10 in one direction. Within said tube 10, the lens tube $10^b$ is adjustably mounted. The lens 11 mounted in said tube $10^b$ bears upon an annular flange 12 of the latter and is held in engagement with said flange by means of a tube 13 loosely fitting within the tube 10 and which is held in place by means of the ring 14 and plate $14^a$ having the central aperture $14^b$, as clearly indicated in Fig. —7—. The said front and rear walls 5 and 3 of the camera are adapted to swing inwardly so that when the camera is folded the former will rest upon the upper face of the bottom 1, the said partition wall 8 being adapted to be swung in the same direction as the front wall 5, the latter being adapted when the camera is folded to rest at its inner end upon the hinged end portion of said partition wall 8.

Hinged along one edge of the bottom wall 1 is the side wall 15 of the camera, and to the latter along its other edge there is hinged one member 16 of the top wall of the camera, the latter being made in two sections; the other part or section 17 thereof being similarly hinged to the free edge portion of the other side wall 18. The latter is similarly hinged to the other side edge of the bottom wall. The section 16 of said top wall is provided on its free edge and on its opposite faces with parallel strips 19 which project beyond the free edge thereof to form a groove 20 between the opposed projecting portions thereof in which the free edge of the section 17 is adapted to be received to form a light-proof joint between said members. U-shaped metallic bands 21 are mounted upon the said strips 19 at respectively opposite ends thereof and pass over the ends of said strips and the contiguous ends of the section 16 of the top wall, being secured by means of rivets 22 or in any other suitable manner, the said U-shaped bands 21 serving to reinforce the end portions of said strips 19 and being provided further with perforations in which the pins 23 carried by the front and rear walls of the camera are adapted to be received; said pins projecting from the horizontal walls of the rabbets 4 and 6. Mounted upon the upper edges of said front and rear walls of the camera are two latch members 24 which are adapted to be turned on their pivots 25 to engage the said bands 21 and hold the latter in engagement with the pins 23. The lower of said strips 19 is provided between its ends with a recess or cutaway portion 26 into which the upper edge portion of the partition wall 8 is adapted to be sprung thus holding said partition wall 8 parallel with the front and rear walls of the camera when the latter is positioned ready for use. Mounted upon the strips 19 between the ends thereof is a pin 27 which is adapted to be engaged by the latch member 28 pivotally mounted upon the section 17 of the top wall to hold the latter firmly in engagement with said section 16.

Suitable means, such for example as the pivoted braces 29, are provided for maintaining the front and rear walls of the camera in a vertical position relatively to the bottom wall 1 when setting up the camera preparatory for use; said braces 29 being pivotally secured at one end to the respective front and rear walls of the camera and being adapted at their free ends to enter recesses in the bottom wall 1 adapted to receive the same. It will be obvious, of course, that after the side walls and top walls have been positioned to complete the setting up of the camera said front and rear walls of the latter will be held in place thereby without the aid of said braces 29.

In the front wall 5 of the camera is a rectangular opening 30 which is covered by a pane 31 of clear glass against which the film side of the plate 32 is adapted to be pressed and held while making enlarged prints from said plate. It is obviously desirable in making such enlarged prints to position the plate 32 relatively to the lens so as to bring out upon the enlarged print and in the middle that particular portion of the picture which it may be desired to reproduce accurately to the exclusion probably of a part of the contents of the plate 32. To accomplish this it may be necessary for producing the best results, to dispose said plate 32 angularly or move the same laterally or vertically or slightly both ways so as to bring that portion of the picture particularly desired to be reproduced in proper position for reproduction. To this end we provide means adjustably mounted on the front wall for the purpose of engaging the lower edge portion of the plate; said means being particularly illustrated in Figs. —9— to —11— inclusive. In the outer edges of the front wall 5 are longitudinal grooves 33, best shown in Fig. —2—. In these grooves the U-shaped flat springs 34 carried upon the arms 35 of a bar 36 are received; one arm 37 of each of said springs being free and serving to normally engage the inner face of said bar 36 with the front face of the front wall 5 of the camera. Said inner face of said bar 36 is provided with a longitudinal groove 38 which is enlarged at a plurality of points 39. In this groove 38 lies a wire 40 which is provided at a plurality of points between its ends with off-set portions 41 which are received in the enlarged portions 39 of the groove 38; said wire being pivotally mounted in said arms 35 at the ends of the bar 36; one end of said wire being bent to form a crank 42 thereon by means of which it is turned. The said wire 40 when turned on its longitudinal axis serves to throw the off-set portions 41 thereof into engagement with the outer face of the front wall 5 of the camera and force the inner face of the bar 36 outwardly therefrom against the action of the arms 37 of said springs 34 thus providing an open space between the inner face of said bar and the outer face of the wall 5 to receive the edge portion of the plate 32 and after said plate has been inserted into said space and releasing the crank 42 the arms 37 of the springs will compress the said bar against the edge portion of the plate 32 thus clamping the same in position and holding it. Pivotally secured to the upper end portion of the outer face of the front wall 5 is a member 42' having a yielding or flat spring arm 43 which is adapted to be turned to engage the upper end portion of the plate 32 and coacts with the bar 36 to hold said plate 32 in position. Exposed portions of the pane 31 are covered by means of an opaque mat in the usual manner so as to exclude direct light from the camera. The said bar 36 is vertically adjustable on the front wall of the camera and the grooves in which the springs 34 are contained being made sufficiently deep to permit the bar 36 to be tilted out of parallelism with the upper and lower edges of the front wall. In the rear wall 3 of the camera a pane 44 of clear glass is similarly mounted to cover the rectangular opening 45. The said pane 44 is disposed between the planes of the front and rear faces of the rear wall 3 and against this pane 44 the bromid or other sensitized paper is adapted to be compressed thus holding the same in a focal plane of the camera. Mounted in said rear wall 3 is a hinge plate 46 which serves to compress the sensitized paper against said pane 44 to hold the latter in position and further to exclude the light from the rear thereof said plate being maintained in its closed position by means of a latch 47 of any suitable construction.

The operation of our said camera is substantially the same as that of similar apparatus commonly used. It possesses advantages over the ordinary enlarging camera in that it is collapsible and further because by reason of this all parts of the apparatus are easily accessible. Thus, for example, when first setting up this camera preparatory to making an enlarged plate it becomes necessary, usually, to adjust the position of the lens so as to focus the picture upon the plane of the rear face of the pane 44. To accomplish this the side wall 18 and section 17 of the top wall are not brought up to closed position but that side of the camera is left open. By now covering the camera with a black cloth the operator may test the focus in the usual manner by placing a ground glass or sheet of tissue paper in a focal plane and upon which the picture contained in negative on the plate 32 is projected. He may now reach in with his right hand and by turning the lens tube 10 in either direction vary the position of the lens until all of the lines of the picture are sharply defined in a focal plane. Having accomplished this he proceeds to operate the camera in the usual manner using either daylight or artificial light as desired.

When the camera is collapsed preparatory to shipment or for other disposition between the intervals of use the side wall 18 and section 17 of the top wall are first released and turned back so that the outer face of the side wall 18 is parallel with the bottom plate 1 and the said section 17 of the top wall contacts on its outer face with the outer face of said side wall 18 and lies between the latter and said bottom wall 1. The section 16 of the top wall and the side wall 15 are then similarly turned back so that the outer face of the side wall 15 overlaps the side wall 18; the section 16 of said side wall 15 being folded back upon the side wall 15 so as to lie between the latter and the side wall 18. The front and rear walls 3 and 5 and the partition wall 8 are at the same time turned down as previously described. Thus the entire device is made to occupy very little space. The front wall is, as usual of less area than the rear wall, and, therefore, the bottom, side and top walls of the camera are tapered so as to be narrower at their forward ends than at their rearward ends, as will be obvious.

We claim as our invention:

1. An enlarging camera comprising a bottom plate, end plates hinged thereto at the ends thereof, a lens carrying plate hinged thereto between the ends thereof, all of said last-named plates adapted to be turned to lie upon the upper face of said bottom plate, side plates hinged to the side edges of the bottom plate and adapted to fold underneath the latter, a top wall consisting of two sections hinged to the free edges of the side plates, and means for engaging said sections of said top wall with each other and with the end plates and lens carrier when the latter are in their upright positions whereby all of said respective walls are maintained in position to form a box.

2. An enlarging camera comprising a bottom plate, end plates having rabbeted edges hinged thereto at the ends thereof, a lens carrying plate hinged thereto between the ends thereof, all of said last-named plates adapted to be turned to lie upon the upper face of said bottom plate, side plates hinged to the side edges of the bottom plate and adapted to fold underneath the latter, a top wall consisting of two sections hinged to the free edges of the side plates, said side and top walls adapted to rest at their ends in the rabbets of said end plates, and means for engaging the sections of said top wall with each other and with said end plates, whereby the latter and said side walls are maintained in position to form a box, one of said sections of said top wall provided with means for engaging said lens carrying plate to hold the latter in its upright position.

3. A knockdown camera comprising a tapered box having a bottom wall, side walls and a top wall, said walls having hinged connections with each other, end walls hinged to said bottom wall at the ends thereof, a lens carrying wall hinged to said bottom wall between the ends thereof, there being rabbets in said end walls adapted to receive the ends of the side and top walls, and means for removably engaging the top wall with said end walls whereby the former and the side are held against movement relatively to the end walls and vice versa, said end walls adapted to swing inwardly when the device is knocked down, said top wall provided with means for engaging said lens-carrying wall therewith to hold the same in upright position.

4. A knockdown camera comprising a tapered box having a bottom wall, side walls and a top wall, said walls having hinged connections with each other, end walls hinged to said bottom wall at the ends thereof, a lens carrying wall hinged to said bottom wall between the ends thereof, there being rabbets in said end walls adapted to receive the ends of the side and top walls, and manually operable locking means for removably engaging the top wall with said end walls whereby the former and the side are held against movement relatively to the end walls and vice versa, said end walls adapted to swing inwardly when the device is knocked down, said top wall provided with means for engaging said lens-carrying wall therewith to hold the same in upright position.

5. A knockdown camera comprising a tapered box having a bottom wall, side walls hinged thereto, a top wall consisting of two sections each hinged to one of said side walls, the free edge of one section of said top wall provided with a groove for receiving the free edge of the other section, end walls hinged to said bottom wall at the ends thereof, a lens carrying wall hinged to said bottom wall between the ends thereof, there being rabbets in said end walls adapted to receive the ends of the side and top walls, locking means carried by said end walls for engaging one section of said top wall therewith, and a latch for engaging the other section of said top wall with the section engaged by said locking means, whereby the side and end walls are held against movement relatively to each other and to the bottom wall, said end walls adapted to swing inwardly when the device is knocked down, said top wall provided with means for engaging said lens-carrying wall therewith to hold the same in upright position.

6. A knockdown enlarging camera comprising a bottom wall, side and end walls and a lens-carrying wall hinged to said bottom wall, said side walls adapted to be swung to oppose the under face of said bottom wall and said end walls and lens-carrying wall to be swung to rest upon the upper face of said bottom wall when said camera is collapsed, said end walls provided with rabbets to receive the ends of the side walls and the top wall, said top wall composed of two sections hinged to the free ends of the respective side walls, and one of the same provided with a groove in its free edge to receive the free edge of the other and having perforations, there being a recess in the lower face of one of said sections of said top wall to receive the upper edge of the lens-carrying wall to hold the same parallel with the end walls when the camera is set up for operation, pins on the end walls adapted to enter the said perforations in one of said sections of said top wall, latches for holding the latter in engagement with said pins, and a latch for engaging said other section of said top wall with the section engaged by said pins.

7. In a knockdown camera, end walls having rabbets in their edges, side walls and a top wall adapted to be received at their ends in said rabbets of said end walls, there being continuous grooves in the walls of said rabbets opposing the inner faces of the side and top walls and in the planes of the ends of the latter and into which light rays passing between the ends of said side and top walls and the opposing walls of the rabbets may be projected.

8. In a device of the kind specified, a front wall having an opening covered with a transparent material, said front wall equipped with guide grooves in its side edges, a member for clamping negatives in contact with said transparent material comprising a bar provided at its ends with projections, U-shaped flat springs each secured at the free end of one of its arms to the free end of one of said projections, said springs adapted to enter and engage said guide grooves; there being a groove in the face of said bar opposing said front wall, a shaft provided with lateral projections mounted in said last groove, and a crank arm at one end of said shaft, said springs serving to hold the grooved face of said bar in contact with the outer face of said front wall, and said shaft when turned adapted to throw said bar outwardly from the front face of said front wall against the action of said springs.

9. In an apparatus of the kind specified, a transparent front wall provided in its side edges with grooves, a bar spanning the face of said wall, projections at the ends of said bar, and flat springs secured to said projections and engaging in said grooves and longitudinally movable therein, said springs coacting with the front walls of said grooves to hold said bar yieldingly in contact with the face of said front wall, whereby a negative to be reproduced may be yieldingly clamped between said bar and said wall.

10. In an apparatus of the kind specified, a transparent front wall provided in its side edges with grooves, a bar spanning the face of said wall, projections at the ends of said bar, flat springs secured to said projections and engaging in said grooves and longitudinally movable therein, said springs coacting with the front walls of said grooves to hold said bar yieldingly in contact with the face of said front wall, whereby a negative to be reproduced may be yieldingly clamped between said bar and said wall, and a manually operable member carried by said bar and adapted to engage the face of said wall engaged by said bar to move the latter outwardly against the action of said springs.

11. In an apparatus of the kind specified, a transparent front wall provided in its side edges with grooves, a bar spanning the face of said wall, projections at the ends of said bar, and U-shaped flat springs each secured at one end of one of its arms to the said projections of said bar and engaging in said grooves and adapted to hold said bar yieldingly in contact with the front face of said wall.

12. In an apparatus of the kind specified, a transparent front wall provided in its side edges with grooves, a bar spanning the face of said wall, projections at the ends of said bar, and U-shaped flat springs each secured at one end of one of its arms to the said projections of said bar, the other arm of each of said springs bearing upon the front wall of its groove, and adapted to hold said bar yieldingly in contact with the front face of said wall.

13. In an apparatus of the kind specified, a transparent front wall provided in its side edges with grooves, a bar spanning the face of said wall, projections at the ends of said bar, U-shaped flat springs each secured at one end of one of its arms to the said projections of said bar, and engaging in said grooves and adapted to hold said bar yieldingly in contact with the front face of said wall, said grooves being of greater depth than the width of said springs to permit said bar to be tilted.

14. In an apparatus of the kind specified, a transparent front wall provided in its side edges with grooves, a bar spanning the face of said wall, projections at the ends of said bar, U-shaped flat springs each secured at one end of one of its arms to the said projections of said bar and engaging in said grooves and adapted to hold said bar yieldingly in contact with the front face of said wall, and a manually operable member carried by said bar and adapted to engage the face of said wall engaged by said bar to move the latter outwardly against the action of said springs.

15. In an apparatus of the kind specified, a transparent front wall provided in its side edges with grooves, a bar spanning the face of said wall, projections at the ends of said bar, U-shaped flat springs each secured at one end of one of its arms to the said projections of said bar, the other arm of each of said springs bearing upon the front wall of its groove, and adapted to hold said bar yieldingly in contact with the front face of said wall, said grooves being of greater depth than the width of said springs to permit said bar to be tilted, and a manually operable member carried by said bar and adapted to engage the face of said wall engaged by said bar to move the latter outwardly against the action of said springs.

In testimony whereof we have signed our names in presence of two subscribing witnesses.

HENRY BURKE.
WILLIAM A. PETERS.

Witnesses:
  M. A. BARTEAUX,
  K. M. KENNEDY.